United States Patent
Cohen et al.

(10) Patent No.: US 8,074,215 B2
(45) Date of Patent: Dec. 6, 2011

(54) XML-BASED CONTROL AND CUSTOMIZATION OF APPLICATION PROGRAMS

(75) Inventors: Dror Cohen, Kadima (IL); David Rachamim, Kfar Hanagid (IL); Yiftach Nun, Kiryat Ata (IL); Ronen Rubinfeld, Zichron Ya'acov (IL); Vishal Trivedi, Bangalore (IN)

(73) Assignee: SAP AG, Walldorf (DE)

( * ) Notice: Subject to any disclaimer, the term of this patent is extended or adjusted under 35 U.S.C. 154(b) by 1315 days.

(21) Appl. No.: 11/403,913

(22) Filed: Apr. 14, 2006

(65) Prior Publication Data
US 2007/0245340 A1    Oct. 18, 2007

(51) Int. Cl.
*G06F 9/445* (2006.01)
(52) U.S. Cl. .................................................. 717/174
(58) Field of Classification Search .................. 717/174
See application file for complete search history.

(56) References Cited

U.S. PATENT DOCUMENTS

| | | | |
|---|---|---|---|
| 6,272,489 B1 * | 8/2001 | Rauch et al. | 707/4 |
| 2003/0144846 A1 * | 7/2003 | Denenberg et al. | 704/277 |
| 2003/0217333 A1 * | 11/2003 | Smith et al. | 715/513 |
| 2004/0177315 A1 * | 9/2004 | Brown et al. | 715/500 |
| 2005/0027628 A1 * | 2/2005 | Lammersdorf et al. | 705/35 |
| 2005/0097547 A1 * | 5/2005 | Ramachandran et al. | 717/177 |
| 2005/0125788 A1 * | 6/2005 | Lupini et al. | 717/174 |
| 2006/0123414 A1 * | 6/2006 | Fors et al. | 717/177 |

* cited by examiner

*Primary Examiner* — Wei Zhen
*Assistant Examiner* — Lanny Ung
(74) *Attorney, Agent, or Firm* — Kenyon & Kenyon LLP

(57) ABSTRACT

Operation of a computer system is governed by an executable application and settings set forth in an XML document to which the application refers during execution. When an application is published for installation, it includes the application and a base XML document. Portions of the base XML document are marked as editable during installation. During installation, an installation manager review the base XML document, identifies editable portions therein and reads installation settings data therefor. The installation manager may generate a modified XML document representing the settings of the base XML document and any modified settings obtained for installation. Modified settings data may be obtained from an operator, from a computer system on which installation occurs or from a dataset representing settings data obtained in prior installations.

11 Claims, 4 Drawing Sheets

100

200

300

400

XML-BASED CONTROL AND CUSTOMIZATION OF APPLICATION PROGRAMS

BACKGROUND

The present invention relates to computer software systems that permit installation-side customization and protection schemes therefor.

Businesses and end users are demanding increasingly more tailored software solutions for their day-to-day operations. The earliest application programs were shipped as final-state products which did not permit alteration at installation sites. Slowly, more and more software publishers began to build into their products features that can be customized to meet their customers' needs, from configuring user interface features to altering behavior of the applications.

An application typically passes through multiple stages before reaching its end user and is likely to be modified at each stage. For example, an application publisher may wish to disable selected functionality within an application because of its contract agreement with a particular client. It can customize the application before delivering to the client. Later, when the client receives the application, it may want to further customize it, such as configure it to comply with certain setup standards, before installing it on to corporate computers. It would be desirable if certain settings can be changed without affecting other settings and the stability of the application.

To this end, developers may publish Extensible Markup Language ("XML") documents that contain information which would govern the appearance and behavior of underlying applications. XML is a tag- and attribute-driven computer language designed to capture data and data structures in plain text form. XML documents are simple to use and easy to change, yet capable of describing sophisticated data structures. As a customization solution, they offer both power and convenience. However, there are disadvantages.

A standard XML document lacks the ability to self-protect. The document is either fully exposed for revision or not exposed at all. If a developer were to fully expose an XML configuration document to its users, this would permit the users to alter any value without restriction, and could place the underlying application's stability at risk. For example, a user could open and edit an XML document in a word processor or a standard XML parser, which usually allows full access to the document. If the user unwarily and incorrectly modifies a critical setting, the application could behave unexpectedly or cease to operate altogether.

Accordingly, there is a need in the art for a technique that would take advantage of XML's simplicity and flexibility, yet allow fine tuned control over which portion of the document can be accessed and which should be protected and hidden from the user.

DETAILED DESCRIPTION

Embodiments of the present invention provide a means for software developers to exercise control over the accessibility of XML documents that are used to determine the appearance and behavior of their products. In one embodiment, the XML document is not accessible directly to users. This protects the file from being inadvertently changed. The developer may mark certain fields of the document indicating that they are fields the users may have access to, i.e. by placing indicator tags around a field, or giving the field certain attributes. When the finalized XML document is ready for installation, an installation manager may locate the marked fields and make them visible to an operator (typically, an IT professional), while keeping the remaining sections hidden. The installation manager also may have a permission structure defined therefor, which regulates access to certain parameter data depending upon a user's permissions.

The present invention is also flexible enough to use external application modules when exposing a field for user edit, which may vary according to the types of input available to the installing operator. Application modules may manage different sets of user input. For example, one application module may be provided simply to replace discrete text segments (substituting one set of text for another) or to manage references to image data (corporate logos and the like). Another application module might be used to manage interactive pull down menus in a graphical user interface. A third application module may manage external date-entry data that makes sure the date entered is in a certain format and not older than a predetermined date. Other embodiments may call upon application modules that import parameter data autonomously, without operator interaction.

Figure 1:
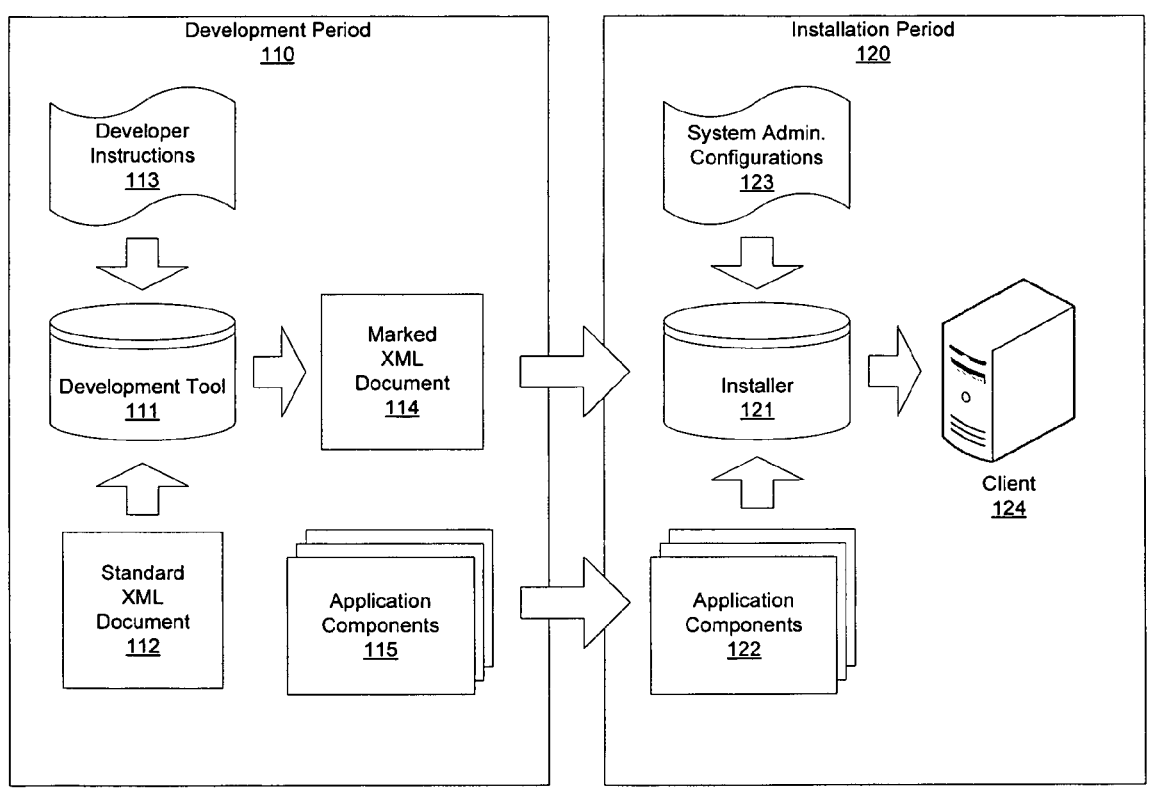
FIG. 1 is an exemplary illustration of one possible development-to-installation workflow of the present invention.

FIG. 1 illustrates the lifecycle of an XML parameters document according to an embodiment of the invention. An XML document may pass through two primary stages in this embodiment: a development period 110 and an installation period 120.

The development period 110 may involve a development tool 111, a standard XML document 112, instructions pertaining to the XML document from the developer 113, a resulting marked XML document 114, and the underlying application 115. The standard XML document 112 may contain parameter data that controls the appearance and behavior of the underlying application. The developer's instructions 113 may specify which portion of the standard XML document 112 can be exposed to operators and possibly modified according to installation criteria. The development tool 111 may mark the standard XML document 112 according to the instructions 113 and may generate a marked XML document 114. The marked XML document 114 identifies customizable parameter data fields and distinguishes them from other parameter data fields that are protected from alteration. The underlying application 115 is the core software to be deployed during the installation period 120.

During development, an application developer may create a standard XML document 112 containing parameter data on which the underlying application relies to determine how it should appear and function. This document 112 stores data that may govern various aspects of the application and the developer may want to expose some to users for customization. The developer may pass the standard XML document 112 to a development tool 111 and specify which sections should be protected, which should be exposed, and in what ways the exposed sections may be altered. The instructions 113 may be inputted either manually via input means available to the developer or identified to the tool 111 through an automated process, such as from a file or a remote location. The development tool 111 may mark the XML document 112 accordingly and may save the result to a new file 114. Alternatively, instead of starting with a pre-generated XML document 112, the development tool 111 may include authoring tools that permit a developer to draft the parameter definitions from scratch; in this embodiment, the development tool 111 may generate the marked XML document 114 directly, omitting a need for a separate source document 112. In either embodiment, the marked XML document 114 contains necessary parameter data along with the proper access control indicators understandable by the installer, and is ready for use during the installation period 120. The underlying application 115 could be either provided separately from or developed within and compiled by the development tool 111.

In another embodiment, a developer, while creating a marked XML document 114, may also provide the development tool 111 with command paths to external application modules, not shown here, that would perform various functions on certain user inputs. These paths would be captured in the marked XML document 114 for later use by an installer 121. Modules can be associated with input fields one at a time or to an entire field type. For example, if there are multiple instances of a date-typed field, the developer can either link each instance with the same application module individually, or designate the module to the type and the development tool 111 will automatically generate any necessary XML codes for each field of that type. The marked XML document 114 may also contain parameters that can affect the behavior and appearance of application modules, and the development tool 111 could prompt the developer to specify these parameters and their default values. Alternatively, it can automatically locate and insert the allowable parameters of each linked application module by reading its interface signature, looking it up in a reference file, or through any other viable means.

The installation period 120 may involve an installer 121, the underlying application to be installed 122 provided by the development period 110, various configurations from an operator (typically, a system administrator) 123, and a client computer 124. The application components 122 make up the core software to be installed. All the customizable fields in the marked XML document 114 can be modified during installation time by the operator to configure the software according to certain installation criteria 123. The installer 121 prepares the application for runtime operation on a target computer system, such as target 124.

During installation, the installer 121 loads the marked XML document 114, which resulted from the development period 110, and identifies the customizable sections. For each alterable setting, the installer 121 may prompt the system administrator for direct inputs 123. The administrator can either change the settings as he desires or accept default settings. Alternatively, customization may be done via automated processes. Such processes may capture appropriate parameters from system information stored on the client or at a remote location, or by using suitable system services available. Customization data may also be generated by the installer or application modules based on previously-entered data. For example, if the installer detects patterned or repeated information entered by an operator, it may suggest a default value based on that information. When parameter data is entered, the installer 121 may modify the marked XML document 114 with the parameter data 123. When all modifications are completed, the installer 121 installs the application components 122 on to the client 124 along with an updated copy of the XML document.

Figure 2:
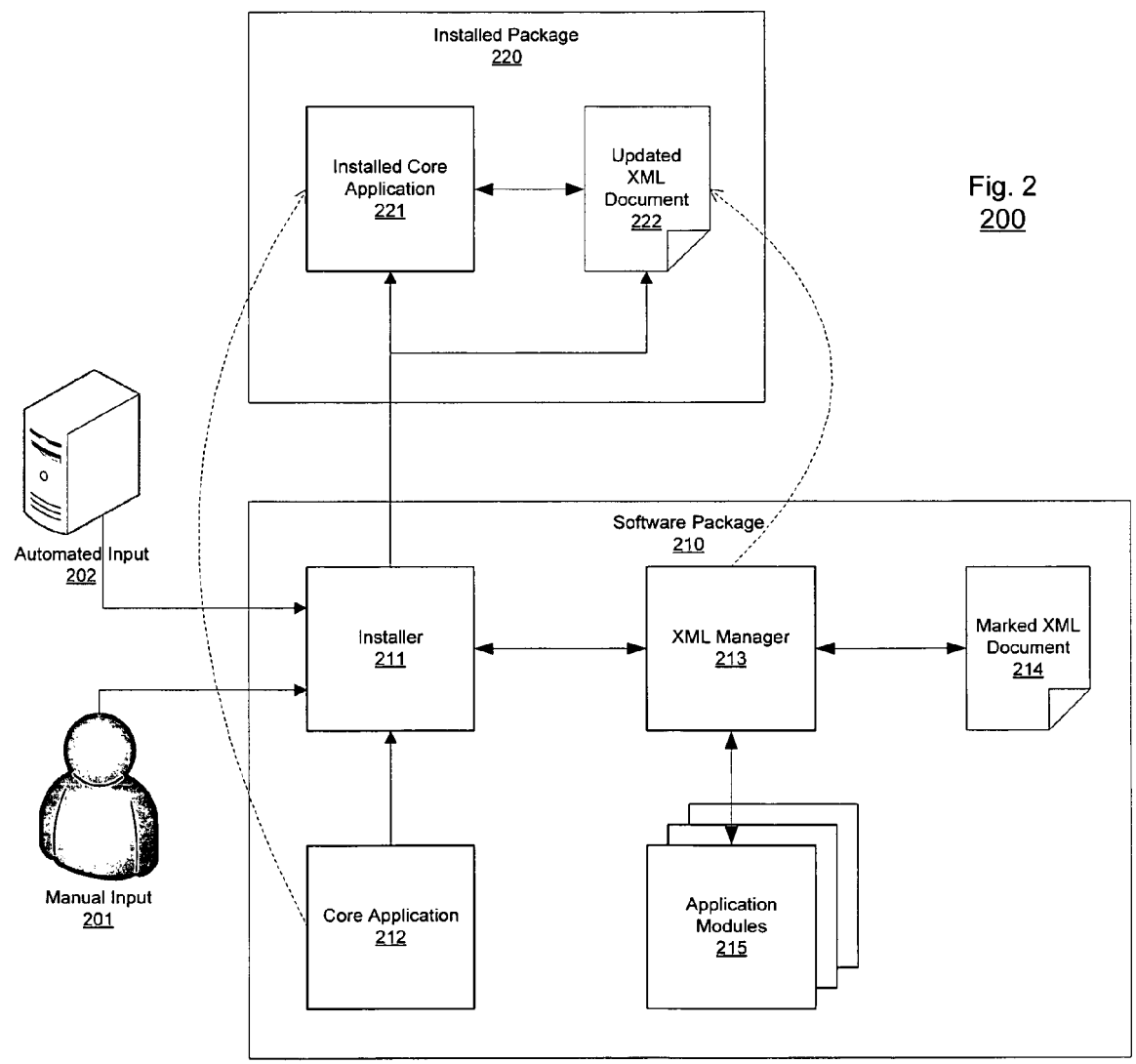
FIG. 2 shows a typical interaction scheme between components of a software package and how an XML document could affect the underlying application.

FIG. 2 illustrates the structure of a software system before and after delivery to an installation platform according to an embodiment of the present invention. The software system prior to installation 210 may include an installer 211, the core application to be installed 212, an XML manager 213, a marked XML document 214, and a plurality of application modules 215. Also, the system may accept inputs from a range of sources during installation, such as manual input from an operator (typically, a system administrator) 201 or automated input 202 over predefined command paths. Input may also be automatically generated based on data previously entered by an operator. The core application 212 may represent the executable content of the software system. The marked XML document 214 may contain parameter data upon which the core application relies to configure its operation. The XML manager 213 may read the marked XML document 214 and selectively may expose portions thereof to an operator to customize the installation and operation of the core application 212. The application modules 215 may support the modification of the parameter data contained in the marked XML document 214. The installer 211 may guide the installation process and may deploy the core application 212 and a copy of the marked XML document 214 onto the installation platform.

Following deployment, the installed package 220 may include an installed core application 221 and an updated XML document 222. The installed application 221 is an executable derivative of the core application 212 from the software package 210 that is deployed for specific usage on the installation platform. The updated XML document may contain the necessary parameter data from the original XML document 214 along with any modifications put in place during the installation process.

During installation, the installer 211 may inquire to the XML manager 213 for settings that can be modified by the operator before it proceeds to deploy the core application 212. The XML manager 213 may review the provided marked XML document 214, may identify the modifiable sections and may pass them to the installer 211. The XML manager 213 may invoke any appropriate application modules 215 that are designated within the marked XML document 214 to assist the modification of those settings. As mentioned before, the modules 215 may ensure that the modified values are appropriate for the operation of the application, such as within a certain range or in a certain format. The installer 211 could prompt the operator for input 201. The operator can either accept default settings or modify them in accordance with installation criteria. Alternatively, the installer 211 could extract configuration settings from an automated source 202. This source could be a local file containing proper settings, a network stream of the same, or any other available means that does not need human interactions.

When the modifications to the settings are complete, the installer 211 may send the updated settings back to the XML manager 213, which will in turn provide the installer 211 with an updated copy of the XML document 214. The installer 211 then may deploy the core application 212 on to the installation platform as an executable 221 and store, with the installation, the updated copy of the original XML document 214 as a revised XML document 222. The installed application 221 may at runtime interact with the updated XML document 222 to determine its proper appearances and behaviors.

Figure 3:
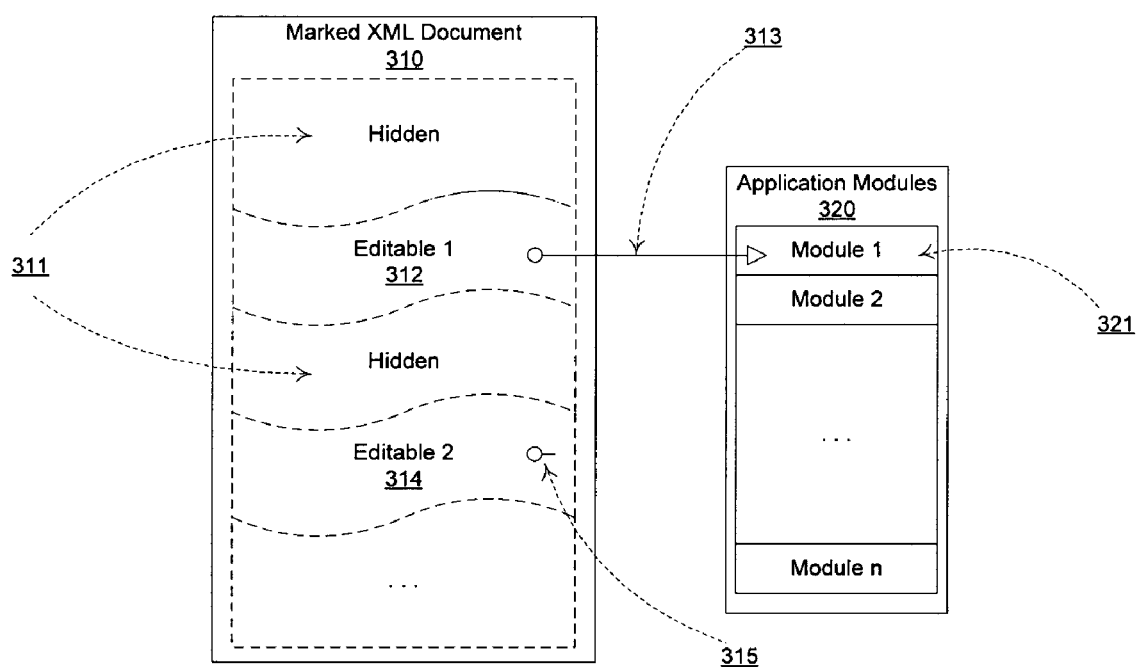
FIG. 3 demonstrates the concepts of hidden and editable sections and XML linkage to external data processors.

FIG. 3 illustrates exemplary relationships between editable fields in an XML document and external application modules in one embodiment of the present invention. The XML document 310 may contain sections of XML code that are either hidden 311 or editable, 312 and 314. Each editable section also has links 313 and 315 to individual application modules 321 within a set of external modules 320. The XML document 310 may store parameter data that affects the appearances and behaviors of the underlying application. The hidden portions 311 reflect those settings that are not available for user customization and are protected from modification. The editable portions, 312 and 314, represent those that could be customized in accord to installation criteria. The application modules set 320 encapsulates an assortment of modules that could be used by an XML manager, such as 213. Each module 321 is assigned to perform certain tasks to ensure modifications to the linked XML document section are appropriate for the underlying application. The modules 320 may perform tasks or provide data based on information previously entered by an operator. For example, if an operator consistently enters a specific range of values, a module may provide content- and/or context-based rules appropriate to that range. In some embodiments, such actions may be overridden by an operator if they are inappropriate.

When an XML manager 213 loads an XML document 310, it may expose all the sections that are labeled as editable, 312 and 314, and protect those that are hidden 311. Different sections can be marked by tags, attributes, or any other viable means. For each exposed section, the manager checks to see if a link exists to a set of external application modules 320 provided by the developer. The link can be represented in a variety of ways, such as URL, software component identifier, or a command path to another application. Not all sections need to have an associated application module. In the current instance, the first section 312 has a link 313 to an external application module 321, while the second section 314 contains a null link 315, indicating no module is supplied. A null link 315 could be represented either as an absence of the link field, a link that is "null" in value, or in some other way suitable for the embodiment. Sections that might not need separate modules include non-error-prone settings, such as text boxes and predefined lists. If a section does require an application module, the XML manager 213 will load it in to memory to monitor modifications to the associated section.

In an embodiment, a manager 213 may develop a history dataset (not shown) to store edits previously made be the system. The manager 213 may survey the dataset for patterns of replacements previously performed to determine if recurring replacements exists. The set of previous replacements may represent a series of replacements performed in a single installation or even across multiple installations in the same computer system. If patterns are detected, the manager may develop a rule that may govern future instances of installation. The manager may propose the rule to a system operator for confirmation before committing the rule to an active rule set. Therafter, as the manager reviews XML documents for new installations, it may compare editable sections against the rule set to determine if any sections are members of the previously detected patterns. If a match is detected, the manager 213 may execute a replacement autonomously, without need for operator intervention. In other embodiments, the replacement may be proposed to an operator and confirmation may be requested before the replacement is executed. In this manner, the system module may "learn" behavior based on past "experience" during an installation.

In another embodiment, each portion of the marked XML document 310 may contain additional attributes or tags which can make it either hidden or editable during runtime according to the role of the current user. For example, when a user of type A carries out the installation process, he might only be able to make changes to sections 312 and 314; while another user of type B could be given the authority to edit section 312 and several sections of 311, but not section 314. One possible implementation of this feature might be adding an additional attribute to each section tag, enumerating all user types that are allowed to edit it.

Figure 4:
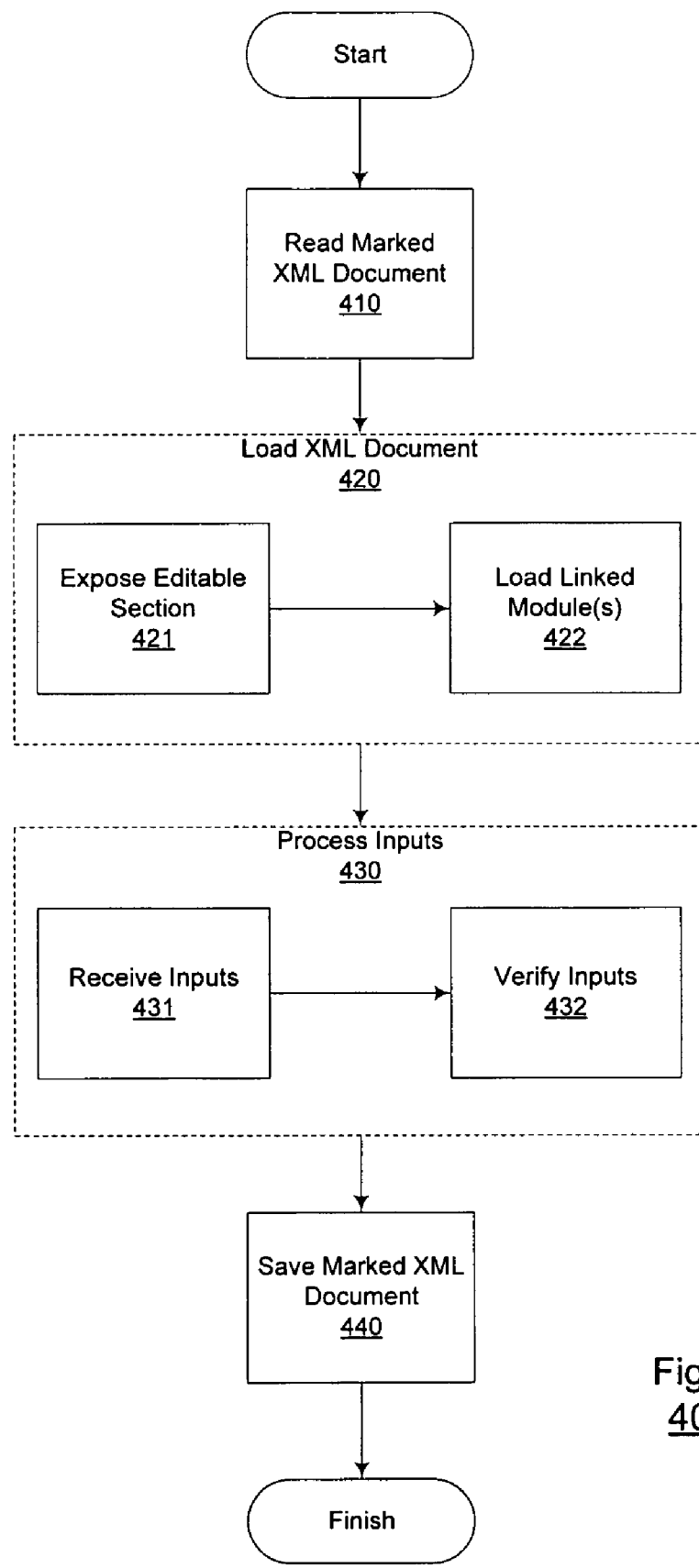
FIG. 4 illustrates the operation flow of a possible embodiment of the present invention.

FIG. 4 illustrates the operation flow of a possible embodiment of the present invention from the beginning of a request to allow parameter data modification to completion. The operation includes reading of a marked XML document 410, loading of the document 420, processing inputs 430, and saving an updated copy of the document 440. The loading step further decomposes into exposing an editable section to allow modification 421 and loading any external application modules 422 associated with the section. The input processing step includes receiving inputs 431 and verifying inputs 432.

The embodiment starts by reading the supplied XML document 410 into memory. Typically, an XML document is stored in memory as a hierarchical data structure; but other methods can be used as well. When loading the document 420, sections that are labeled as editable are extracted and exposed 421 to the user. Sections that are not exposed are hidden in the background, closed to user access. For each editable section, all of the associated external application modules, if any, are placed into memory 422. This loading operation is repeated for each section. Once the entire document has been processed, the embodiment waits for modifications to the exposed parameter data and processes them as they come in 430. Each set of inputs received 431 may go through a verification process 432 to ensure that the change is suitable for the application's operations. The verification 432 may be handled by appropriate application modules previously loaded 422. Alternatively, some inputs can be left alone without needing special verification. Once the user finishes modifying the settings, the embodiment updates and saves the XML document with the new values, 440, and exits. Each value could be saved as it is changed. Alternatively, changes could be saved in sets or all at the same time, similar to the "Apply" function commonly found in Microsoft Windows applications.

In another embodiment, there can be option paths built into the marked XML document which may result in more than one iteration of the steps presented in FIG. 4. With option paths, not all editable sections are necessarily known from the outset. Some sections may become editable as a result of the options selected during a prior iteration. For example, if the user indicated earlier that the underlying application is being installed for personal use, it might not be appropriate to display a set of fields designed to capture corporate information. Option paths can be implemented as prerequisite conditions for each section that must be satisfied before that section becomes editable, triggers linking the selection of certain options to the activation of later sections, or any other viable means.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A computer implemented tool, comprising:
   an executable application program stored on a memory and to be executed by a processor,
   a first XML document containing:
   parameter definitions that configure the application program's operation,
   instruction references identifying parameter definitions of the first XML document that are eligible to be modified by a user of the computer implemented tool, distinguishing the parameter definitions of the first XML document that are eligible to be modified from parameter definitions that are protected from alteration, and specifying in what ways the modifiable parameters may be altered;

a history dataset to store previous replacements, if patterns in the history dataset are detected, developing a rule set that governs future instances of installation, based on previous portions replaced by parameter selections in prior installations, and a plurality of input modules, each having input interfaces adapted to solicit input data of a respective type, wherein at least one instruction reference within the first XML document addresses a corresponding input module.

2. The computer implemented tool of claim 1, further comprising an installation wizard to review the first XML document for instruction references, query an operator for modifications and generate a second XML document from the first XML document and any operator-provided modifications.

3. An installation method for a computer application, comprising:

installing a core application program on a client computer system, reading a source XML document which contains parameter definitions that are to be used by the core application program to control runtime behavior of the application program, identifying portions of the source XML document which contain parameter definitions that are alterable during installation, protecting portions of the source XML document which contain parameter definitions that should not be altered, for the identified portions, reading parameter selections representing installation preferences for the alterable parameter definitions, developing a history dataset to store previous replacements, detecting patterns in the history dataset, if patterns in the history dataset are detected, developing a rule set that governs future instances of installation, based on previous portions replaced by parameter selections in prior installations, confirming the rule set with a system operator, comparing the identified portions to the rule set, wherein, upon a match with the rule set, the reading of parameter selections comprises reading the parameter selections from the rule set, upon detecting repeated information entered by an operator, suggesting a default parameter value, and storing on the client computer system an installed XML document representing parameter definitions from the source XML document and installation preferences that override the alterable parameter definitions.

4. The installation method of claim 3, wherein the reading of parameter selections comprises querying an installation operator and receiving operator input in response thereto.

5. The installation method of claim 3, wherein the reading of parameter selections comprises reading system parameter data from the client computer system.

6. The installation method of claim 3, wherein the source XML document contains tag references to identify portions therein that contain alterable parameter definitions.

7. The installation method of claim 6, wherein the tag references contain pointers to application modules that manage reading of the parameter selections representing the installation preferences.

8. A development method for a computer application, comprising:

developing a core application program, reading a source XML document which contains parameter definitions that are to be used by the core application program to control runtime behavior of the application program, identifying portions of the source XML document which contain parameter definitions that are alterable during installation, marking the source XML document so that the identified portions can be distinguished from the remainder of the source XML document, developing a history dataset to store previous replacements, detecting patterns in the history dataset, if patterns in the history dataset are detected, develop a rule set that governs future instances of installation, based on previous portions replaced by parameter selections in prior installations, and storing with the core application program a marked XML document representing the source XML document updated with the markings, wherein the identifying of portions comprises querying an operator and receiving operator input in response thereto, wherein the identifying of portions further comprises reading a reference file which contains a list of at least one portion that are alterable during installation, and wherein the marking of the source XML document comprises adding tag or attribute references which identify the alterable and unalterable portions.

9. A non-transitory computer readable medium having program instructions stored thereon that, when executed, causes a computer system to:

install a core application program on a client computer system, read a source XML document which contains parameter definitions that are to be used by the core application program to control runtime behavior of the application program, identify portions of the source XML document which contain parameter definitions that are alterable during installation, protect portions of the source XML document which contain parameter definitions that should not be altered, for the identified portions, read parameter selections representing installation preferences for the alterable parameter definitions, develop a history dataset to store previous replacements, detect patterns in the history dataset, if patterns in the history dataset are detected, develop a rule set that governs future instances of installation, based on previous portions replaced by parameter selections in prior installations, confirm the rule set with a system operator, compare the identified portions to the rule set, upon detecting repeated information entered by an operator, suggesting a default parameter value, wherein, upon a match with the rule set, the reading of parameter selections comprises reading the parameter selections from the rule set, and store on the client computer system an installed XML document representing parameter definitions from the source XML document and installation preferences that override the alterable parameter definitions.

10. A non-transitory computer readable medium having program instructions stored thereon that, when executed, causes a computer system to:

read a source XML document which contains parameter definitions that are to be used by a core application program to control runtime behavior of the application program, identify portions of the source XML document which contain parameter definitions that are alterable during installation, mark the source XML document so that the identified portions can be distinguished from the remainder of the source XML document, develop a history dataset to store previous replacements, detect patterns in the history dataset, if patterns in the history dataset are detected, develop a rule set that governs future instances of installation, based on previous portions replaced by parameter selections in prior installations, and store a marked XML document representing the source XML document updated with the markings, wherein the identifying of portions comprises querying user and receiving user input in response thereto.

11. The computer implemented tool of claim 1, further comprising command paths to external application modules that would perform functions on user inputs.

* * * * *